United States Patent [19]

Tortorello et al.

[11] 4,427,804

[45] Jan. 24, 1984

[54] PRIMARY AMINE FUNCTIONAL POLYMER COMPOSITIONS AND COATINGS

[75] Inventors: Anthony J. Tortorello, Elmhurst; Mary A. Kinsella, Manhattan, both of Ill.

[73] Assignee: DeSoto, Inc., Des Plaines, Ill.

[21] Appl. No.: 353,099

[22] Filed: Mar. 1, 1982

[51] Int. Cl.$^3$ .................. C08L 63/10; C08L 63/02
[52] U.S. Cl. .................. 523/404; 523/410; 523/420; 523/426; 524/501; 524/592; 524/901
[58] Field of Search ............ 523/420, 414, 404, 410, 523/426; 524/901, 592, 501; 525/454, 524

[56] References Cited

U.S. PATENT DOCUMENTS

| | | | |
|---|---|---|---|
| 3,291,775 | 12/1966 | Holm | 528/121 |
| 3,523,925 | 8/1970 | Kamal et al. | 528/44 |
| 3,947,339 | 3/1976 | Jerabek et al. | 204/181 R |
| 3,975,251 | 8/1976 | McGinniss | 204/181 R |
| 4,017,438 | 4/1977 | Jerabek et al. | 523/420 |
| 4,031,050 | 6/1977 | Jerabek | 524/901 |
| 4,096,105 | 6/1978 | McGinniss | 260/29.6 NR |
| 4,190,567 | 2/1980 | Ohmura | 260/29.2 TN |

*Primary Examiner*—Theodore E. Pertilla
*Attorney, Agent, or Firm*—Dressler, Goldsmith, Shore, Sutker & Milnamow, Ltd.

[57] ABSTRACT

A monosecondary amine containing blocked primary amine groups is provided by reacting a monosecondary amine containing at least one primary amine group (such as diethylene triamine) with a ketone which is hindered to prevent reaction with secondary amino hydrogen atom (such as methyl isobutyl ketone) while removing water. This product disperses in water with the aid of a solubilizing acid to provide a solution which will emulsify a liquid polymer dispersed therein. The water hydrolyzes the blocked primary amine groups to restore reactivity. This product can also be reacted with 1,2-oxirane or isocyanate-functional polymers to provide products which are dispersible in water with a solubilizing acid. These dispersions will electrodeposit at the cathode.

8 Claims, No Drawings

PRIMARY AMINE FUNCTIONAL POLYMER COMPOSITIONS AND COATINGS

DESCRIPTION

1. Technical Field

This invention relates to monosecondary amines which contain primary amine functionality which is blocked in order that the secondary amino hydrogen atom can be utilized to join the blocked primary amine functionality to a polymer. The invention includes the polymers which are produced and it further includes the hydrolysis product thereof in which the blocking groups are removed so as to restore the desired primary amine functionality.

2. Background Art

U.S. Pat. No. 4,190,567 relates to cationic polyurethane emulsions. These polyurethanes are formed by reacting an isocyanate terminated prepolymer with a polyalkylene polyamine in ketone solvent. If water were removed in this reaction, then something approaching the present development might be obtained, but no removal of water is suggested. Even if water had been removed, the ketones suggested for use as solvent are unhindered (preferably methyl ethyl ketone) so that the product of the reaction including the removal of water would be a mixture containing a cyclic compound (an imidazolidine).

In this invention it is desired to obtain only ketimine groups in addition to a single secondary amino group.

Another prior disclosure of interest is U.S. Pat. No. 4,096,105 which describes the reaction of diethylene triamine with methyl ethyl ketone to produce a mixture of primary and secondary amine groups.

DESCRIPTION OF INVENTION

In accordance with this invention an amine containing a single secondary amino group and at least one primary amino group is reacted with a hindered ketone to produce a ketimine group by the elimination of water.

The reaction of the hindered ketone with the primary amine functionality is conveniently carried out at moderate temperature with the aid of an acid catalyst with the reaction being encouraged by the removal of water.

It is essential in this invention that the ketone which is selected be hindered to avoid reaction with the secondary amino hydrogen atom. Where such reaction occurs, a five membered ring is formed (an imidazolidine) and this destroys the desired primary amine functionality.

Typical hindered ketones contain one methyl or ethyl group and a second group containing at least four carbon atoms so as to be large enough to prevent reaction with the secondary amino hydrogen atom. This description of hindered ketones will describe the preferred noncyclic ketones, but cyclic ketones may also be used if they are hindered by being alpha branched. Even a single methyl group alpha to the carbonyl group is sufficient to prevent reaction with a secondary amino hydrogen atom.

The amines which may be utilized in this invention are preferably illustrated by diethylene triamine. This amine contains two primary amine groups and a single secondary amine group. Corresponding compounds containing three or four carbon atoms in place of the ethylene group are also useful. Further, corresponding compounds containing only a single primary amine group are also useful, such as N-methyl-1,3-propanediamine.

The invention of reaction is not a prime feature of this invention, appropriate temperatures ranging from 70° C. to 100° C.

The catalysis of the reaction is also simple, any strong Bronsted acid being useful, such as sulfuric acid or paratoluenesulfonic acid, for example. It is particularly convenient to employ a sulfonic acid-functional anion exchange resin, such as Dowex 50W-X8 which is a product of Dow Chemical Company.

The reaction is conveniently carried out in the presence of an organic solvent which simplifies the removal of water. These solvents are illustrated by cyclohexane and benzene. The reaction would normally be carried out by heating the solution to reflux temperature and then separating the water from the condensed vapors in a Dean-Starck trap.

After the reaction is over, heating is continued to boil off the solvent in which the reaction is conducted. A vacuum is normally used to ease the burden of removing the solvent.

The result of the foregoing is a ketimine-blocked monosecondary amine monomer. These monomers are typically liquids which are dispersible in water with the aid of a solubilizing acid, illustrated by acetic acid. Solubilizing acids are well known in the art of dispersing amine-functional polymers, and any of these known acids may be used herein.

Polymers may be emulsified into the aqueous monomer dispersions of this invention, and these emulsions constitute useful coating compositions. For example, a liquid polyepoxide, such as Epon 828 (Shell Chemical Company), may be dispersed as above described to provide a coating composition having some significant stability. Upon application to a substrate, the acetic acid would evaporate together with the water, and this would leave behind a reactive mixture of primary amine and polyepoxide which will cure slowly at room temperature and more rapidly at moderately elevated temperatures, such as about 150°–250° F.

While the primary amine groups are blocked as taught by this invention, the monosecondary amine-functional monomer can be reacted with reactive polymers, especially those containing the 1,2-oxirane group or the isocyanate group. These will react by an addition reaction with the secondary amino hydrogen atom to couple the monomers of this invention to the polymer while retaining the blocking groups on the amine groups.

It is desired to point out that the presence of water will hydrolyze the blocked amine groups to restore the primary amine functionality. This can be done by employing an aqueous system or by using water upon the applied coating in order to free the reactive primary amine groups for cure in-situ.

A typical polymeric product in accordance with this invention is provided by reacting one mole of the monosecondary amine monomer of this invention with each equivalent of oxirane group in a diglycidyl ether of bisphenol A (Epon 828) to provide a reaction product containing blocked primary amine groups. This reaction product is dispersible in water with the aid of a solubilizing acid, such as acetic acid, to provide an aqueous dispersion which can be electrodeposited at the cathode of a unidirectional electrical system.

Another polymeric product can be made by reacting stoichiometric proportions of the monosecondary amine monomer of this invention with an organic polyisocyanate, such as, diphenylmethane diisocyanate, to provide a polyurethane containing blocked primary amine groups. This product is dispersible in water with the aid of a solubilizing acid, such as acetic acid, to provide an aqueous dispersion which can be formulated into a coating by the addition of a polyepoxide or an aminoplast resin or a blocked isocyanate to provide an aqueous dispersion or emulsion which will cure after application and vaporization of volatiles and the application of appropriate curing conditions which may range from room temperature to about 500° F.

EXAMPLE 1

Into a 2-liter single neck flask is weighed 47.7 g of diethylenetriamine, 99.5 g of methylisobutyl ketone, 0.25 g of Dowex 50W-X8 ion exchange resin and enough benzene to make a final volume of 750 ml. The flask is then equipped with a magnetic stirrer, Dean-Starck trap and reflux condenser (with drying tube).

The mixture is then heated to reflux with stirring and water is azeotropically removed. Reflux is continued until water is no longer collected (16.6 g theory). The solution is then cooled to ambient temperature and the resin is filtered. The filtrate is then concentrated by rotary evaporation under vacuum.

The product is transferred to an amber bottle without further purification and stored under nitrogen in a refrigerator.

EXAMPLE 2

Aqueous dispersion of the product in Example 1 is then accomplished. The product is weighed into a stainless steel beaker and treated with an equivalent amount of acetic acid. Low shear agitation is then applied for a few minutes to ensure complete mixing. Agitation is then increased to high shear and deionized water is added slowly. Viscosity continues to rise until inversion is reached as evidenced by dramatic viscosity reduction. Addition of water to the desired concentration is continued.

EXAMPLE 3

A stoichiometric proportion of Epon 828 is added to the solution of Example 2 with agitation to provide a coating emulsion which cures slowly at room temperature (about 1 day) and which cures within 1 hour at 200° F.

The stoichiometry is based upon 1,2-oxirane groups in the Epon 828 and the primary amino hydrogen atoms which are uncovered by hydrolysis in the aqueous solution.

EXAMPLE 4

An isocyanate-terminated prepolymer was provided by reacting 95.2 g of diphenylmethane diisocyanate with 224.8 g of polytetraoxymethylene glycol (Quaker Oats product Polymeg 650) in 240 g of 1,2-dimethoxyethane and 168 g of 2-methylpyrrolidinone. This prepolymer is then mixed with the product of Example 1 in a stoichiometric amount based on secondary amino hydrogen and isocyanate functionality and the reaction is carried out at 60° C. for 30 minutes.

EXAMPLE 5

The product of Example 4 was dispersed in water as is Example 2 and formulated into an epoxy emulsion as in Example 3, to provide a coating composition which is useful as described in Example 3.

EXAMPLE 6

The epoxy emulsion described in Example 5 is diluted with deionized water to 10% solids and electrodeposited on steel panels as the cathode using an applied voltage of 75 volts.

EXAMPLE 7

An acrylic copolymer is made by solution copolymerization of 200.6 g of butyl acrylate, 387.9 g of methyl methacrylate and 45.5 g of glycidyl methacrylate. This glycidyl-functional acrylic copolymer, in solution is 288.0 g of 1,2-dimethoxyethane, 480 g of acetonitrile and 192.0 g butyrolactone, is reacted with the product of Example 1 using stoichiometric proportions based on 1,2-oxirane and secondary amine functionalities. The reaction is carried out in the same way described in Example 6. The product is then dispersed in water with acetic acid, as described in Example 3, and this provides a solution to which is added a stoichiometric proportion of Epon 828 to provide a coating solution which cures as previously indicated.

What is claimed is:

1. An emulsion of a liquid polyepoxide polymer in a water solution of a monosecondary amine containing at least one primary amine group which is ketimine blocked by reaction with a ketone which is hindered to prevent reaction with a secondary amino hydrogen atom, said hindered ketone being selected from the group consisting of noncyclic ketones containing one group selected from methyl or ethyl and a second group containing at least four carbon atoms, and cyclic ketones which are substituted in the alpha position, and said monosecondary amine being dispersed in the water of said emulsion with the aid of a volatile solubilizing acid.

2. An emulsion as recited in claim 1 in which said monosecondary amine is diethylene triamine.

3. An emulsion as recited in claims 1 or 2 in which said ketone is methyl isobutyl ketone.

4. An emulsion of a liquid polyepoxide polymer in a water solution of the addition reaction product of a polymer containing a functional group selected from 1,2-oxirane and isocyanate with a stoichiometric proportion of a monosecondary amine containing at least one primary amine group which is ketimine blocked by reaction with a secondary amino hydrogen atom, said hindered ketone being selected from the group consisting of noncyclic ketones containing one group selected from methyl or ethyl and a second group containing at least four carbon atoms, and cyclic ketones which are substituted in the alpha position, said stoichiometry being based on said oxirane or isocyanate group in said polymer and secondary amine groups in said monosecondary amine, and said reaction product being dispersed in the water of said emulsion with the aid of a volatile solubilizing acid.

5. An emulsion as recited in claim 4 in which said monosecondary amine is diethylene triamine and said ketone is methyl isobutyl ketone.

6. An emulsion as recited in claim 4 in which said addition reaction product is of a polymer containing isocyanate functional groups.

7. An emulsion as recited in claim 6 in which said monosecondary amine is diethylene triamine and said ketone is methyl isobutyl ketone.

8. An emulsion as recited in claim 4 in which said addition reaction product is of a polymer containing 1,2-oxirane functional groups, said polymer being a glycidyl-functional acrylic solution copolymer.

* * * * *